United States Patent

[11] 3,601,241

[72] Inventors Joachim Kuhnt
Dortmund;
Joachim Ciongwa, Dortmund-Wambel,
both of, Germany
[21] Appl. No. 842,466
[22] Filed July 17, 1969
[45] Patented Aug. 24, 1971
[73] Assignee Holstein & Kappert Maschinenfabrik
Phönix, GmbH
Dortmund, Germany
[32] Priority July 20, 1968
[33] Germany
[31] P 17 82 119.1

[54] APPARATUS FOR TRANSPORTING BOTTLES OR THE LIKE
10 Claims, 1 Drawing Fig.
[52] U.S. Cl. .................................................. 198/20,
198/110
[51] Int. Cl. .................................................. B65g 47/00
[50] Field of Search........................................... 198/20, 23,
24, 26, 79

[56] References Cited
UNITED STATES PATENTS
| | | | |
|---|---|---|---|
| 2,822,910 | 2/1958 | Wachsmuth.................. | 198/24 |
| 3,178,005 | 4/1965 | Read............................ | 198/24 |
| 3,233,718 | 2/1966 | Ladewig et al................ | 198/24 |
| 3,370,689 | 2/1968 | Van Der Winden........... | 198/20 |

Primary Examiner—Richard E. Aegerter
Assistant Examiner—Douglas D. Watts
Attorney—Michael S. Striker ABSTRACT: Apparatus which transports bottles between a platform and the cells of a continuously or intermittently moving endless cell conveyor comprises a pair of endless chains which carry spaced transversely extending supporting bars travelling upwardly from the platform toward successive cells of the endless conveyor or vice versa to engage bottles from below and to transport such bottles along an upwardly inclined guide plate. A set of oval gears drives the chains in such a way that the speed of the supporting bars increases during travel toward or away from the cells so that the speed of a supporting bar which actually supports a bottle is higher when such bar is adjacent to a cell and lower when such bar is adjacent to the platform.

PATENTED AUG 24 1971
3,601,241
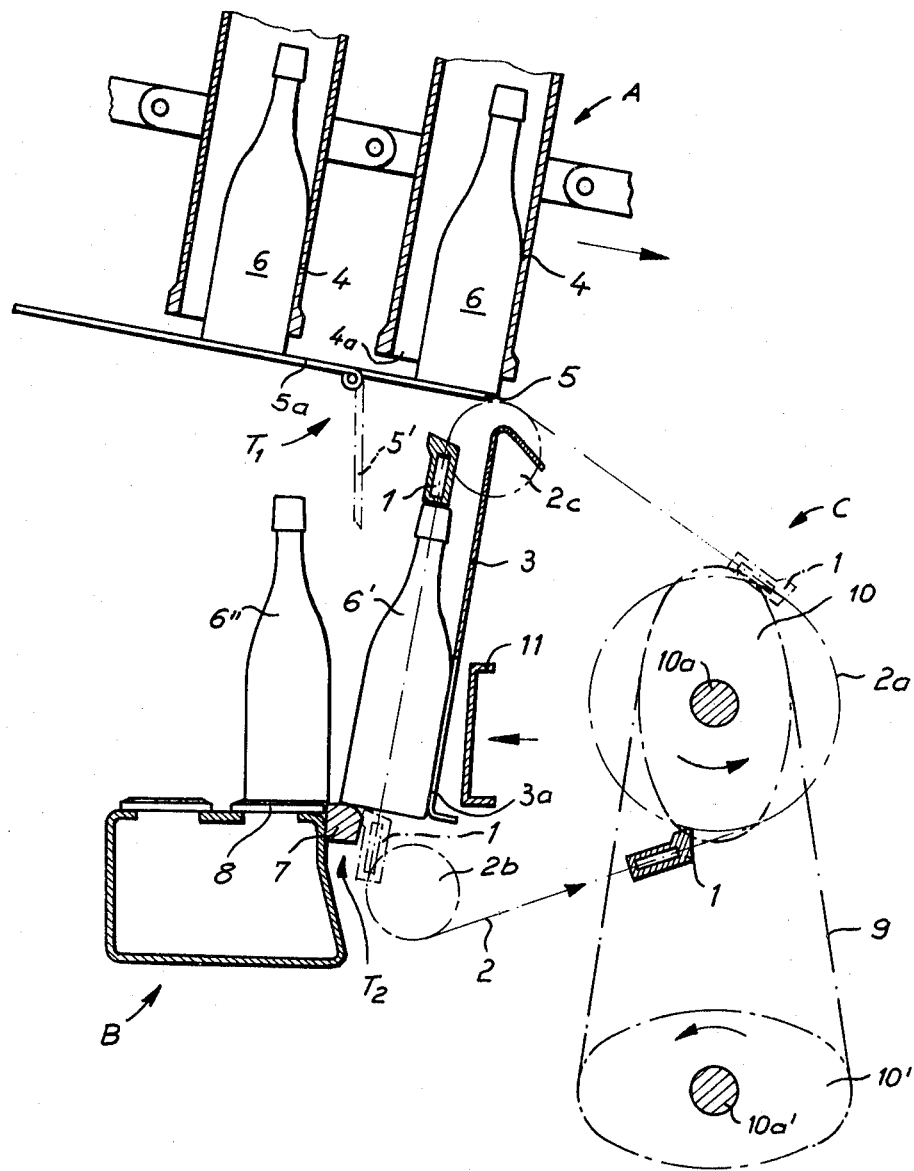
INVENTORS:
JOACHIM KUHNT
JOACHIM CIONGWA
BY Michael J. Striker
their ATTORNEY 3,601,241

APPARATUS FOR TRANSPORTING BOTTLES OR THE LIKE

BACKGROUND OF THE INVENTION

The present invention relates to apparatus for transporting bottles or like commodities. More particularly, the invention relates to apparatus for transporting bottles between two conveyors at least one of which is preferably a continuously driven endless cell conveyor. Still more particularly, the invention relates to apparatus which can be utilized for transport of bottles in bottle cleaning machines.

It is already known to employ a reciprocatory supporting member for transfer of bottles between a platform and the cells of a bottle conveyor. As a rule, the cells of the conveyor move at a level above a stationary platform which receives bottles from a second conveyor. The supporting member lifts a bottle from the platform into an empty cell while it performs an upward stoke and the supporting member thereupon moves downwardly to engage a fresh bottle which has been delivered onto the platform during transport of the preceding bottle. A drawback of such apparatus is that their output is too low. This is due to the fact that the supporting member transports bottles only while it moves in one direction, namely, from the platform toward an empty cell. Therefore, such apparatus are not suited for use in modern high-speed bottle cleaning or like machines.

It was also proposed to employ a set of continuously driven supporting members which travel along an endless path having a portion extending between a delivery station and a receiving station so that the supporting members engage successive bottles at the delivery station and transport them toward the receiving station. Such apparatus are quite satisfactory when the conveyor which accepts bottles at the receiving station operates intermittently so that each of its cells dwells at the receiving station for a given period of time, namely, during actual introduction of a bottle. However, when the conveyor which receives bottles travels continuously, the just described apparatus are not satisfactory because the supporting members are unable to effect proper introduction of bottles into successive cells while such cells travel past the receiving station. This is due to the fact that the supporting members of conventional transporting apparatus are driven at a constant speed. In accordance with still another proposal, the supporting members transport bottles along a guide surface which is pivotable about a horizontal axis so that it follows the movement of a cell at the receiving station during introduction of a bottle into such cell whereby the bottle is less likely to change its orientation or to change its orientation to such an extent that it cannot be properly admitted into the adjoining cell. A drawback of this proposal is that the mechanism which is employed to pivot the guide surface in synchronism with the movement of the cell conveyor is quite bulky, complicated and prone to malfunction so that it contributes excessively to the initial and maintenance cost of the apparatus.

SUMMARY OF THE INVENTION

An object of the invention is to provide a transporting apparatus which is designed in such a way that it can readily transport bottles or like commodities to and from a continuously travelling conveyor without necessitating the provision of costly and complicated auxiliary equipment.

Another object of the invention is to provide a transporting apparatus which can transport bottles or like commodities into or from the cells or like receiving means of a continuously or intermittently moving conveyor.

A further object of the invention is to provide a transporting apparatus which can be readily installed in presently known bottle washing or like machines.

An additional object of the invention is to provide a transporting apparatus which can treat bottles or like breakable or deformable commodities gently, which can be designed to transport such commodities upwardly or downwardly, and which can be fully integrated into existing bottle washing or like machines without necessitating substantial changes in the design and/or mode of operation of such machines.

The improved transporting apparatus comprises a first conveyor (e.g., an endless cell conveyor) having a plurality of receiving means and arranged to travel along a predetermined path to thereby move its receiving means past a first transfer station, a second conveyor adjacent to a second transfer station which is spaced from and is preferably located at a level which is different from the level of the first station, and a third conveyor for transporting commodities between the two stations, either from the first station to the second station or vice versa. The third conveyor comprises a plurality of supporting members movable along an endless path having a portion extending between the two transfer stations and operative to support commodities from below to thereby effect transfer of commodities from one of the stations to the other station, and drive means (preferably including a harmonic or quasi-harmonic drive such as a st of oval gears) for moving the supporting members at a varying speed so that the speed of a supporting member which supports a commodity is higher when such member is adjacent to the first station and lower when such member is adjacent to the second station.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic partly elevational and partly sectional view of a transporting apparatus which embodies the invention.

DESCRIPTION OF THE PREFERRED EMBODIMENTS

The transporting apparatus which is shown in the drawing comprises an endless conveyor A having a series of receiving means in the form of cells 4 having open ends 4a. The cells 4 travel along an endless path a portion of which extends above a stationary supporting plate 5a and along a first transfer station T1 occupied by a pivotable flap or gate 5 attached to the downstream end of the plate 5a. When the gate 5a moves to the phantomline inoperative position 5', a bottle 6 which is accommodated in the adjoining cell 4 is free to descent by gravity toward a second transfer station T2 occupied by a stationary platform 7 which can be said to form part of a second conveyor B having plates 8 serving to support transferred bottles 6" from below and to advance such bottles along a horizontal path away from the second transfer station T2.

In accordance with a feature of our invention, the apparatus further comprises a third conveyor C which serves to transport bottles from the station T1 to the station T2 or vice versa. In the illustrated embodiment, the conveyor C is operated to transfer bottles from the cells 4 to the platform 7. This third conveyor comprises a pair of endless flexible elements (only one shown), e.g., link chains 2 which carry a set of transversely extending equidistant supporting bars 1. These bars travel sideways and are designed to support bottles 6 from below during transfer from the cells 4 onto the platform 7. Portions of the chains 2 travel along the left-hand side of an upwardly inclined stationary guide plate 3 along which the bars 1 slide at the time they support bottles 6' from below and deliver them to the platform 7. The guide plate 3 forms part of the third conveyor C and this conveyor further comprises a novel drive which moves the chains 2 and the supporting bars 1 at a varying speed so that a bar which is about to intercept a freshly released bottle 6 moves rapidly in a direction away from the adjoining cell 4 and that the bar 1 thereupon advances at a gradually decreasing speed to gently deposit the bottle on the platform 7. The just-mentioned drive comprises a set of oval gears 10, 10' which are connected by an endless chain 9. The shaft 10a of the gear 10 drives a sprocket wheel 2a for the chains 2. The shaft 10a' for the oval gear 10' is driven by an electric motor or the like, now shown. The numerals 2b, 2c denote additional sprocket wheels for the chains 2.

The second conveyor B further comprises a pusher or a like transfer member 11 which is operated in synchronism with the chains 2 to push a freshly deposited bottle 2' onto the plates 8 and to thus provide at the second transfer station T2 room for reception of the next bottle. The plates 8 from part of an intermittently or continuously travelling conveying structure in the conveyor B.

The guide plate 3 has a window 3a which permits passage of the pusher 11 when the latter moves in a direction to the left to transfer a bottle onto the adjoining plate 8. The supporting bars 1 consist of elastomeric material or they may be provided with elastic liners which engage the bottles during transport between the stations T1 and T2. It will be noted that the upper surface of the platform 7 is curved to permit convenient transfer of bottles onto the plates 8 whereby the bottles are automatically erected during engagement with the front face of the pusher 11.

The Operation

When a loaded cell 4 reaches the station T1, the gate 5 is caused to assume its phantom-line position 5' so that the bottle 6 thereabove can descend by gravity to be intercepted by the adjoining supporting bar 1 which moves at a relatively high speed along the left-hand side of the guide plate 3 toward the station T2. As soon as the neck of the bottle 6 on the descending bar 1 moves to a level below the open end 4a of the respective cell 4, the speed of the chains 2 is reduced by the drive means 9, 10, 10' so that the bottle thereupon continues to descend and is gently deposited on the platform 7. The speed of a bar 1 reaches a minimum value when such bar (while it supports a bottle 6') approaches and is immediately adjacent to the platform 7. The pusher 11 thereupon transfers the bottle 6' onto the adjacent plate 8 (see the bottle 6") so that the transfer station T2 is ready to accept the next bottle. The plates 8 preferably form part of an endless band, chain or belt.

It is clear that the improved transporting apparatus is susceptible of many modifications without departing from the spirit of the present invention. For example, the drive for the chains 2 can include any other suitable means which can impart to the supporting bars 1 a harmonic or quasi-harmonic motion, namely, a movement whose seed is higher during certain stages of travel of the respective bar along a predetermined portion of an endless path. However, the illustrated drive has been found to be particularly suited for use in our transporting apparatus because it comprises a small number of relatively simple parts and because such parts insure accurately controllable movements of supporting members 1. Furthermore, the direction of travel of chains 2 can be reversed so that the bars 1 then serve to transport bottles from the conveyor B into the cells 4 of the conveyor A. The pusher 11 is then replaced by a device which can transfer bottles from the plates 8 onto the platform 7.

An important advantage of the just described apparatus is that it can be operated properly even if the conveyor A is a continuously driven conveyor. This is attributed to the fact that the speed of supporting bars 1 varies during travel along the guide plate 3. It was found that the transporting apparatus is also suitable for use in connection with bottle washing or like machines wherein the cell conveyor must be operated intermittently. If the drive for the conveyor A is designed to advance the cells 4 in stepwise fashion, the apparatus which is shown in the drawing can transport bottles at a rate which is substantially higher (at least by about 33 percent) than the rate at which the bottles are being transferred in presently known apparatus. This is attributed to the fact that the length of intervals during which the path for bottles between the transfer stations T1 and T2 is empty is reduced to a minimum i.e., the supporting bars 1 can follow each other at such intervals which are absolutely necessary to insure unimpeded transfer of bottles from the station T1 to the station T2 or vice versa.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. Apparatus for transporting bottles or like commodities comprising a first conveyor having a plurality of receiving means arranged to travel along a predetermined path and to thereby move past a first transfer station; a second conveyor adjacent to a second transfer station; and a third conveyor for transporting commodities between said stations and comprising a plurality of supporting members movable along an endless path arranged in a fixed position relative to said first and second conveyors and having a portion extending between said stations and operative to support the commodities from below to thereby effect transfer of such commodities from one of said stations to the other station, and drive means for moving said supporting members at a varying speed so that the speed of a supporting member which supports a commodity is higher when such member is adjacent to said first station and lower when such member is adjacent to said second station.

2. Apparatus as defined in claim 1, wherein said third conveyor further comprises at least one endless flexible element connected with said supporting members and a plurality of rotary elements turnable about axes arranged in a fixed position relative to said first and second conveyors, and wherein said drive means is arranged to drive said supporting members by way of said flexible element.

3. Apparatus as defined in claim 1, wherein said drive means comprises a plurality of oval gears.

4. Apparatus as defined in claim 1, wherein said third conveyor further comprises guide means along which the commodities slide while moving between said stations.

5. Apparatus as defined in claim 1, wherein one of said stations is located at a level above the other station.

6. Apparatus as defined in claim 1, wherein said receiving means are cells.

7. Apparatus as defined in claim 1, wherein said first conveyor is a continuously moving conveyor.

8. Apparatus as defined in claim 1, wherein said second conveyor comprises a platform located at said second station, a travelling conveying structure adjacent to said platform, and means for transferring commodities between said platform and said travelling conveying structure.

9. Apparatus as defined in claim 1, wherein said drive means is arranged to vary the speed of supporting members stepwise during travel of such members along said portion of said endless path.

10. Apparatus as defined in claim 1, wherein said portion of said endless path is inclined with reference to a horizontal plane.